United States Patent                                         [15]  3,663,218
Yario                                                         [45]  May 16, 1972

[54] BURNABLE POISON FOR NUCLEAR REACTOR

[72] Inventor: William R. Yario, West Simsbury, Conn.
[73] Assignee: Combustion Engineering, Inc., Windsor, Conn.
[22] Filed: Sept. 12, 1969
[21] Appl. No.: 868,955

[52] U.S. Cl. .................................................. 75/177, 176/93
[51] Int. Cl. ........................................................ C22c 15/00
[58] Field of Search ........................................ 75/177; 176/93

[56]         References Cited

UNITED STATES PATENTS

| 3,004,849 | 10/1961 | Raine | 75/177 |
| 3,122,484 | 2/1964 | Iskenderian | 176/93 BP |
| 3,255,092 | 6/1966 | Dee | 176/93 BP |
| 3,362,813 | 1/1968 | Ziolkowski | 176/93 BP |

OTHER PUBLICATIONS

Nuclear Science Abstracts — Vol. 14, 1960, No. 7704, pgs. 975, 976; Vol. 15, 1961 No. 29689 pg. 3,826; Vol. 17, 1963 No. 24637, pg. 3,229

AEC Research and Development Report — KAPL - 2162, Bibb et al., Nov. 1, 1960 pp. 2- 12

*Primary Examiner*—Charles N. Lovell
*Attorney*—Carlton F. Bryant, Eldon H. Luther, Robert L. Olson, John F. Carney, Richard H. Berneike, Edward L. Kochey, Jr. and Lawrence P. Kessler

[57]         ABSTRACT

An alloy for use as a burnable poison in nuclear reactors which consists of 0.5 – 14 weight percent gadolinium and 0 – 4 weight percent tin with the remainder being zirconium.

1 Claims, No Drawings

BURNABLE POISON FOR NUCLEAR REACTOR

BACKGROUND OF THE INVENTION

Commercial light water reactors employ burnable poisons as a means of extending fuel loading life and permitting higher power densities. The burnable poisons absorb neutrons and are depleted in the process. The depletion of the poison compensates for fuel burn-up so that reactivity may remain relatively constant. Boron and boron compounds have been commonly used as poison material. Boron, however, has possible disadvantages in that one helium atom and one lithium atom are generated per boron atom burned up. Because of this behavior, internal gas pressure and chemical compatibility can limit boron containing systems. Additionally, heating due to local energy dispersion of alpha particles emitted upon neutron capture by the boron and excessive growth upon radiation of boron systems must be taken into account in reactor design.

When considering new materials for use as a burnable poison, there are several important poison characteristics which must be taken into account. Firstly, the material selected must be workable in order that it may be fabricated into rods, sheets and tubing for inclusion in the reactor structure. Secondly, the material must be readily distributable in an even pattern throughout the reactor to assure uniform reactivity control without creating the possibility of the development of local hot spots. If the poison material is in a compound or alloy form, distribution of the material within the major constituent must be uniform.

Poison materials in general require corrosion-resistant cladding as protection from the corrosive action of the reactor water. Therefore, it would be additionally desirable that the poison material have a corrosion-resistant characteristic so as to enable it to be used in its unclad form. If such corrosion-resistance could be exhibited by the poison material, a significant savings in material and fabrication costs as well as an increase in reliability would result.

SUMMARY OF THE INVENTION

It has been determined that the element gadolinium is an excellent burnable poison. This is because of its high neutron absorption cross section (i.e., high probability that neutrons will react with a nucleus so as to result in neutron capture) and the fact that the daughter products of the n-gamma reaction are solid state gadolinium isotopes which do not in turn absorb neutrons. However, to meet the necessary structural workability and distribution characteristics desired in a burnable poison, the gadolinium must be incorporated in some other material.

A material found to provide an alloy having the necessary burnable poison characteristics upon the incorporation of gadolinium therein is zirconium. Zirconium has a low absorption cross section so as not to have any substantial effect in and of itself on the chain reaction; it has excellent stability upon radiation; and it shows a good resistance to corrosion in reactor water environment. Gadolinium is readily soluble in zirconium up to about 3 weight percent gadolinium with any additional gadolinium being present as fine particles uniformly distributed throughout the base zirconium. While the addition of gadolinium appears to have a deleterious effect on the corrosion resistance of the zirconium-gadolinium alloy, the addition of tin to the alloy counteracts this effect to the degree that the zirconium-gadolinium-tin alloy can be used within the reactor environment without cladding.

DESCRIPTION OF THE PREFERRED EMBODIMENT

Because of the excellent poison characteristics of gadolinium as noted above, it was desired to find an efficient and economical means by which the gadolinium could be introduced into a nuclear reactor as a burnable poison. It was determined that an alloy of zirconium and gadolinium provided the desirable structural properties of a burnable poison; i.e., workability and solubility of gadolinium in zirconium and uniform distribution of fine particles of the gadolinium-rich phase within the zirconium. Additionally, it was found that the inclusion of tin in the zirconium-gadolinium alloy provided a corrosion-resistant characteristic to the resultant alloy to permit its use within the reactor in an unclad condition.

The zirconium-gadolinium and zirconium-gadolinium-tin alloys in varying percentage compositions were prepared for metallurgical and analytical evaluations by the formation of 50-gram sample buttons by the nonconsumable arc melting process. The buttons were prepared in a water-cooled copper hearth using a tungsten electrode with the power thereto varied from 200–600 amperes at 20 volts. In order to test the workability of the alloy compositions and the dispersion characteristics of the gadolinium in the zirconium, hot and cold working tests were performed with the results shown in Table I and microprobe analysis was conducted with the results shown in Table II.

Directly from a furnace at 1,550° F., the alloy buttons were rolled so that a reduction in thickness of 54–71 percent was achieved with about a 10 percent reduction accomplished per pass. As apparent from Table I, the condition of the samples after hot working was good. The samples were then cleaned and cold rolled at room temperature. Using a reduction schedule of from 5–12 percent per pass, the samples were reduced in thickness from 18–51 percent. The workability characteristics of the varying alloy samples over the range tested was again shown to be excellent by the condition of the samples after such cold working. The majority of the samples remained in good condition with only a few random compositions exhibiting any more than insignificant edge cracking.

Microprobe analysis was utilized to determine the dispersion characteristics of the gadolinium within the zirconium. Compositions of the alloy samples were observed in 20 random areas (10 near the surface and 10 in the interior) by the microprobe beam to asses homogeneity. From the recorded data of Table II, gadolinium was determined to be completely soluble in zirconium up to just under 3 weight percent gadolinium. Above 3 weight percent gadolinium, a fine dark globular gadolinium-rich phase was observed randomly distributed throughout the particular samples. The gadolinium-rich phase was determined to be an oxide of gadolinium containing about 66 weight percent gadolinium.

TABLE I

| Composition | | After hot rolling at 1,550° F. | | | After cold rolling | | |
| --- | --- | --- | --- | --- | --- | --- | --- |
| Gd (w/o) | Sn (w/o) | Reduction in thickness (percent) | Hardness ($P_A$) | Condition | Reduction in thickness (percent) | Hardness ($P_A$) | Condition |
| | | 56 | 52 | Good | 50 | 56 | Good. |
| 2 | | 54 | 53 | do | 50 | 57 | Do. |
| 4 | | 60 | 54 | do | 41 | 59 | Do. |
| 6 | | 60 | 50 | do | 43 | 58 | Edge cracking. |
| 8 | | 59 | 49 | do | 38 | 58 | Good. |
| 10 | | 68 | 52 | do | 27 | 57 | Do. |
| 12 | | 71 | 32 | do | 29 | 56 | Do. |
| 14 | | 71 | 48 | do | 29 | 56 | Do. |
| 1 | 1.5 | 55 | 54 | do | 51 | 60 | Minor edge cracking. |
| 2 | 3.0 | 54 | 58 | do | 50 | 62 | Do. |
| 4 | 2.5 | 63 | 56 | do | 41 | 60 | Good. |
| 6 | 2.5 | 60 | 58 | do | 39 | 60 | Minor edge cracking. |
| 6 | 4.0 | 68 | 61 | do | 18 | 60 | Good. |

TABLE II

Summary of Microprobe Results Obtained from Zr-Gd Alloys Heat Treated at 1200°F for 18 Hours

| Nominal Composition (w/o Gd) | Microprobe Values Variation* (w/o Gd) | Variation (%) | Comments |
|---|---|---|---|
| 1 | 0.97 to 1.03 | ±3 | No Gd-rich phase observed |
| 2 | 1.88 to 2.06 | +3 / −6 | No Gd-rich phase observed |
| 3 | 2.92 to 3.11 | ±3 | Small number of 66 w/o Gd particles |
| 3.5 | 3.42 to 3.64 | +4 / −2 | 66 w/o particles easily seen |
| 4 | 3.77 to 4.24 | ±6 | 66 w/o particles easily seen |
| 5 | 5.69 to 6.26 | +4 / −5 | 66 w/o particles easily seen |

* Range of 20 determinations assuming nominal loadings are correct

In view of the above-discussed results, it can be seen that the zirconium-gadolinium alloy over varying concentrations has the fundamental desired characteristics of a good burnable poison; i.e., workability plus uniform distribution of the poison material. After considerable hot and cold working, the varying alloy combination samples remained in substantially good condition and exhibited a hardness of 32–61 Rockwell A after hot working and 56–62 Rockwell A after cold working. The microprobe analysis showed that about 3 weight percent gadolinium was soluble in zirconium and any additional gadolinium therein existed in a rich phase of fine randomly distributed particles most of which were under three microns in diameter. This arrangement is ideal for a burnable poison in that it will provide a 9 uniform and predictable poison characteristic for reactivity control without creating the possibility of locally developing hot spots.

As noted above, an additional desirable characteristic of a burnable poison is corrosion resistance. Therefore, varying alloy composition samples of zirconium and gadolinium were subjected to corrosion tests in an environment similar to that found in an operating reactor; that is to say, the samples were immersed in water of a chemical composition expected within a pressurized water reactor at a temperature of 680° F. (slightly above the 650° F. maximum permitted within the reactor) and at a pressure of 2,700 psi. As noted in the tabulated results of Table III, the addition of gadolinium to zirconium has a marked detrimental effect on the corrosion properties of the zirconium.

It was determined that the addition of tin to the zirconium-gadolinium alloys resulted in significant improvement in the corrosion-resistance of the new combination, this result being apparent from the data of Table III. As an illustrative example, an alloy sample having 2 weight percent gadolinium disintegrated after 100 hours of test condition while an alloy sample containing 2 weight percent gadolinium and 2.5 weight percent tin gained only 47 mg/dm.$^2$ after 100 hours under the same test conditions. Upon further experimentation, it was found that annealing the as-rolled samples for 18 hours at 1,400° F. in a vacuum prior to testing resulted in still greater corrosion resistance. Where, as an illustrative example, an alloy sample having 4 weight percent gadolinium and 2.5 weight percent tin gained only 50 mg/dm.$^2$ after 500 hours testing when heat treated in the above manner, a similar sample composition not heat treated gained 206 mg/dm.$^2$ after 500 hours testing.

The ideal alloy composition as far as the corrosion-resistance was concerned was determined to contain on a weight percent basis a ratio of between ½–1 part tin to 1 part gadolinium. A composition of the ideal ratio when heat treated in the noted manner has shown such good corrosion-resistant tendencies that it appears that such a zirconium-gadolinium-tin alloy combination can be used in the reactor environment without an external cladding. This will result in considerable cost and manufacturing savings. With such combinations also meeting the criteria of workability and uniform dispersion of the gadolinium in the zirconium, the zirconium-gadolinium-tin combinations have therefore been shown to be an excellent burnable poison for nuclear reactor use.

I claim:

1. A corrosion resistant alloy for use as a burnable poison in nuclear reactors which consists of 1–6 weight percent gadolinium and 0.5–4 weight percent tin with the remainder being zirconium, the ratio of tin to gadolinium on a weight basis being between 1/2 to 1 part tin to 1 part gadolinium.

* * * * *

TABLE III

| Composition,[1] weight percent | Specimen condition [2] | Weight change after indicated time, milligrams/square decimeter | | | | Appearance |
|---|---|---|---|---|---|---|
| | | 100 hrs. | 300 hrs. | 500 hrs. | 700 hrs. | |
| Zr-0.5Gd | Sheet-AR | [3] 1,020 | | | | White scale. |
| Zr-1.0Gd | do | [3] 3,140 | | | | Do. |
| Zr-2.0Gd | do | ([5]) | | | | |
| Zircaloy-4 | Button-AM | 11 | 14 | 14 | 19 | Lustrous black. |
| Zr-2Gd-0.5Sn | do | [3][4] 1,080 | | | | White flaking. |
| Zr-2Gd-2.5Sn | do | 47 | −182 | −158 | −200 | Gray-brown. |
| Zr-2Gd-1.5Sn | Sheet-HT | 15 | | | | Dull black. |
| Zr-2Gd-1.5Sn | Sheet-AR | 113 | | | | Do. |
| Zr-2Gd-2.5Sn | do | 31 | | | 69 | Do. |
| Zr-2Gd-3.0Sn | do | 22 | | | | Do. |
| Zr-2Gd-3.0Sn | Sheet-Ht | 13 | | | | Do. |
| Zr-3Gd-2.5Sn | Sheet-AR | 53 | | | 89 | Do. |
| Zr-3Gd-2.5Sn | Sheet-HT | 39 | 45 | | | Do. |
| Zr-4Gd-2.5Sn | Sheet-AR | 87 | 172 | 206 | | Gray-brown. |
| Zr-4Gd-2.5Sn | Sheet-HT | 32 | 50 | 50 | | Dull black. |
| Zircaloy-4 | do | 14 | 21 | | 24 | Lustrous black. |

[1] All specimens which contain Sn also contain 0.2 Fe and 0.1 Cr.
[2] AR-as rolled; AM-as melted; HT-annealed at 1,400° F. for 18 hours in vaccuum.
[3] Test terminated at this time.
[4] This specimen tested at 600° F.
[5] Disintegrated.